(12) United States Patent
Pettipiece et al.

(10) Patent No.: US 7,330,268 B2
(45) Date of Patent: Feb. 12, 2008

(54) SPECTRAL IMAGING APPARATUS AND METHODOLOGY

(75) Inventors: Kenneth J. Pettipiece, Pine Grove, CA (US); William B. Amos, Cambridge (GB)

(73) Assignee: Bio-Rad Laboratories, Inc., Hercules, CA (US)

( * ) Notice: Subject to any disclaimer, the term of this patent is extended or adjusted under 35 U.S.C. 154(b) by 0 days.

(21) Appl. No.: 11/478,804

(22) Filed: Jun. 30, 2006

(65) Prior Publication Data

US 2006/0250616 A1    Nov. 9, 2006

Related U.S. Application Data

(60) Continuation of application No. 09/536,932, filed on Mar. 27, 2000, now abandoned, which is a division of application No. 09/004,180, filed on Jan. 7, 1998, now Pat. No. 6,051,835, which is a division of application No. 09/316,511, filed on May 21, 1999, now Pat. No. 6,108,082.

(51) Int. Cl.
*G01B 9/02* (2006.01)

(52) U.S. Cl. ..................................................... 356/456

(58) Field of Classification Search ................ 356/451, 356/452, 456
See application file for complete search history.

(56) References Cited

U.S. PATENT DOCUMENTS 4,786,170 A    11/1988  Groebler
(Continued)

FOREIGN PATENT DOCUMENTS

GB         2 024 412 A      1/1980
(Continued)

OTHER PUBLICATIONS

T. Reid, et al., "Simultaneous Visualization of Seven Different DNA Probes by in situ Hybridization Using Combinatorial Fluorescence and Digital Imaging Microscopy" Proc. Natl. Acad. Sci., USA, (Feb. 1992) vol. 89, pp. 1388-1392.
(Continued)

*Primary Examiner*—Hwa (Andrew) Lee
(74) *Attorney, Agent, or Firm*—Townsend and Townsend and Crew LLP

(57) ABSTRACT

A method and apparatus for an improved spectral imaging system is provided. The system is capable of measuring the fluorescence, luminescence, or absorption at selected locations on a sample plate. The emissions detection subassembly can tune to any wavelength within a continuum of wavelengths utilizing an interferometric spectral discriminator. The interferometric spectral discriminator creates an interferogram from which the wavelength spectra for each pixel of the array can be calculated, typically using Fourier transform analysis. In one aspect, the chromatic accuracy of the system is calibrated using a calibration slit placed in the input aperture of the input relay lens but outside of the sample image. The slit is illuminated using a source of known wavelength. The fringe count versus the wavelength of the slit illumination source is monitored and used to calibrate the spectral discriminator. In another aspect, a transparent optic is included in the interferometric spectral discriminator that can be inserted into the beam path whenever a monochrome image of the sample is required. The optic produces a large offset in the legs of the interferometer resulting in the fringe density becoming too large to resolve by the individual pixels of the detector array. In another aspect, the interferometric spectral discriminator includes a polarizing beam splitter. The polarizing beam splitter preferentially reflects one polarization while preferentially transmitting a second polarization, thus achieving improved efficiency while minimizing ghosting. In another aspect, a metaphase finder is used to locate areas of interest. The sample plate containing the material of interest is illuminated with light of a wavelength determined to preferentially scatter from objects the size of the metaphase spreads. The intensity of the scattered light versus the location on the sample plate is monitored and used to locate the areas of interest. Preferably the sample plate is also illuminated by light of a second wavelength which is not preferentially scattered by the objects of interest, thus representing the background scatter. By subtracting the background scatter from the primary scattered light, improved object discrimination is achieved.

5 Claims, 4 Drawing Sheets

U.S. PATENT DOCUMENTS

| | | | |
|---|---|---|---|
| 4,786,813 | A | 11/1988 | Svanberg et al. |
| 4,877,966 | A | 10/1989 | Tomei et al. |
| 5,039,219 | A | 8/1991 | James et al. |
| 5,062,942 | A | 11/1991 | Kambara et al. |
| 5,069,769 | A | 12/1991 | Fujimiya et al. |
| 5,127,730 | A | 7/1992 | Brelje et al. |
| 5,138,170 | A | 8/1992 | Noguchi et al. |
| 5,190,632 | A | 3/1993 | Fujimiya et al. |
| 5,213,673 | A | 5/1993 | Fujimiya et al. |
| 5,290,419 | A | 3/1994 | Kambara et al. |
| 5,424,841 | A | 6/1995 | Van Gelder et al. |
| 5,436,718 | A | 7/1995 | Fernandes et al. |
| 5,459,325 | A | 10/1995 | Hueton et al. |
| 5,528,050 | A | 6/1996 | Miller et al. |
| 5,539,517 | A * | 7/1996 | Cabib et al. .............. 356/456 |
| 5,578,818 | A | 11/1996 | Kain et al. |
| 5,784,152 | A | 7/1998 | Heffelfinger et al. |
| 6,519,040 | B1 * | 2/2003 | Amos ...................... 356/453 |

FOREIGN PATENT DOCUMENTS

| | | |
|---|---|---|
| JP | 281945 | 12/1986 |
| WO | WO 90/10219 | 9/1990 |
| WO | WO 96/18205 | 6/1996 |

OTHER PUBLICATIONS

R.M. Cothren, et al., "Gastrointestinal Tissue Diagnostics by Laser-Induced Fluorescence Spectroscopy at Endoscopy," Gastrointestinal Endoscopy, vol. 36, No. 2, (Mar./Apr. 1990), pp. 105-111.

J..Z. Sanders, et al., "Imaging as a Tool for Improving Length and Accuracy of Sequence Analysis in Automated Fluorescence-Based DNA Sequencing," Electrophoresis No. 12, (1991), pp. 3-11.

Product Literature for STORM Gel and Blot Imaging System produced by Molecular Dynamics. © 1995 Molecular Dynamics, Inc.

Bechtol, K.B., et al.; "Using Dyes and Filters in a Fluorescent Imaging System," American Biotechnology Laboratory, (Dec. 1994), pp. 8-10.

Rust, D.M.; "Etalon Filters," Optical Engineering, vol. 33, No. 10, (Oct. 1994), pp. 3342-3347.

Product Literature for "SD100 & SD200 Spectral Bio-Imaging Systems," SD Spectral Diagnostics, Inc. of Agoura Hills, CA and Spectral Diagnostics (SD) Ltd. of Israel, (Nov. 1994), 5 pp.

Product Literature for "FMBIO 100—Fluorescent Imaging Device," Hitachi Software of San Bruno, CA © 1993, 6 pp.

Product Literature for "Model 373A DNA Sequencing System," Applied Biosystems (DS001-373A-290) 4 pp.

Hood, L.E., et al. "Automated DNA Sequencing and Analysis of the Human Genome," Genomics, 1 (1987), pp. 201-212.

Stevenson, C.L., et al.; "Synchronous Luminescence: A New Detection Techinque for Multiple Fluorescent Probes Used for DNA Sequencing," BioTechniques, vol. 16, No. 6, (1994), pp. 1104-1110.

Rafert, J.B, et al.; "Monolithic Fourier-Transform Imaging Spectrometer," Applied Optics, vol. 34, No. 31, (Nov. 1, 1995), pp. 7228-7230.

Sellar, R.G. et al.; "Effects of Aberrations on Spatially Modulated Fourier Transform Spectrometers," Optical Engineering, vol. 33, No. 9, (Sep. 1994), pp. 3087-3092.

Minami, S.; "Fourier Transform Spectroscopy Using Images Sensors," Mikrochimica Acta © Springer-Verlag 1988, vol. III, pp. 309-324.

Product Catalogue for Life Science Solutions produced by Molecular Dynamics. © 1995 Molecular Dynamics, Inc.

* cited by examiner

SPECTRAL IMAGING APPARATUS AND METHODOLOGY

CROSS REFERENCE TO RELATED APPLICATIONS

This application is a continuation of U.S. patent application Ser. No. 09/536,932, filed Mar. 27, 2000 now abandoned, which is a division of U.S. patent application Ser. No. 09/004,180, filed Jan. 7, 1998, now U.S. Pat. No. 6,051,835, which is a division of U.S. patent application Ser. No. 09/316,511, filed May 21, 1999, now U.S. Pat. No. 6,108, 082, all of which are incorporated herein by reference. U.S. patent application Ser. No. 09/536,932 is related to commonly assigned U.S. Pat. No. 5,591,981, issued Jan. 7, 1997, and to commonly assigned, co-pending U.S. Patent Application Ser. No. 08/585,303, filed Jan. 11, 1996, Ser. No. 08/729,111, filed Oct. 11, 1996, and to an application entitled Fluroescence Imaging Instrument Utilizing FISH, U.S. patent application Ser. No. 08/927,556, filed Sep. 9, 1997, the complete disclosures of which are incorporated herein by reference for all purposes.

FIELD OF THE INVENTION

The present invention relates generally to spectral imaging systems and, more particularly, to a method and apparatus for simplifying the use and calibration of a fluorescence imaging system.

BACKGROUND OF THE INVENTION

In the biotechnical field, fluorescent dyes are routinely used as sensitive, non-isotopic labels. These labels are used to identify and locate a variety of cell structures such as specific chromosomes within a DNA sequence. One application, fluorescence in situ hybridization (FISH), first attaches specific chromosome regions with DNA probes and then images the probes using microscopy.

In a paper by Thomas Ried et al. entitled "Simultaneous Visualization of Seven Different DNA Probes by In Situ Hybridization Using Combinatorial Fluorescence and Digital Imaging Microscopy," *Proc. Natl. Acad. Sci. USA: Genetics*, 89 (February 1992), the authors describe a combinatorial probe labeling scheme. The disclosed technique increases the number of target sequences that can be simultaneously detected using a given number of fluorochromes. Specifically, the authors disclose simultaneously analyzing up to seven probes using only three fluorochromes.

A variety of devices have been designed to read fluorescent-labeled samples. In general, a device designed to read and/or image a fluorescent-labeled sample requires at least one light source emitting at one or more excitation wavelengths and means for detecting one or more fluorescent wavelengths.

In U.S. Pat. No. 5,290,419, a multi-color fluorescence analyzer is described which irradiates a sample with two or more excitation sources operating on a time-shared basis. Band pass filters, image splitting prisms, band cutoff filters, wavelength dispersion prisms and dichroic mirrors are use to selectively detect specific emission wavelengths.

In U.S. Pat. No. 5,213,673, a multi-colored electrophoresis pattern reading apparatus is described which irradiates a sample with one or more light sources. The light sources can either be used individually or combined into a single source. Optical filters are used to separate the fluorescence resulting from the irradiation of the sample into a plurality of fluorescence wavelengths.

In U.S. Pat. No. 5,190,632, a multi-colored electrophoresis pattern reading apparatus is described in which one or more light sources are used to generate a mixture of light capable of exciting two or more fluorescent substances. Both optical filters and diffraction gratings are used to separate the fluorescence by wavelength.

In U.S. Pat. No. 5,062,942, a fluorescence detection apparatus is described in which a fluorescent light image is separated into a plurality of virtual images. Bandpass filters are used to separate the virtual images by wavelength.

In U.S. Pat. No. 5,539,517, a method of analyzing an optical image in order to obtain the spectral intensity of each pixel of the image is disclosed. The system utilizes an interferometer.

In an article by Cothren et al. entitled "Gastrointestinal Tissue Diagnosis by Laser-Induced Fluorescence Spectroscopy at Endoscopy," *Gastrointestinal Endoscopy* 36 (2) (1990) 105-111, the authors describe an endoscopic system which is used to study autofluorescence from living tissue. The excitation source is monochromatic with a wavelength of 370 nanometers. Optical fibers are used to collect the fluorescence emitted by the irradiated tissue. Emission spectra are collected from 350 to 700 nanometers using an imaging spectrograph coupled to a gated optical multi-channel analyzer. A similar autofluorescence system was described by Andersson et al. in "Autofluorescence of Various Rodent Tissues and Human Skin Tumour Samples," *Lasers in Medical Science* 2 (41) (1987) 41-49.

The above fluorescence analyzers suffer from a number of performance disadvantages. For example, those systems utilizing a diffraction grating are relatively inefficient, passing only a small portion of the emitted light to the detector assembly. Furthermore, many of the systems require an inordinate amount of time to obtain the spectral intensity for each pixel of the image. Lastly, all of the systems are difficult to calibrate.

An improved spectral imaging system is therefore desired.

SUMMARY OF THE INVENTION

The present invention provides an improved spectral imaging system that can be used to measure the fluorescence, luminescence, or absorption at selected locations on a sample. The emissions detection subassembly can tune to any wavelength within a continuum of wavelengths utilizing an interferometric spectral discriminator. The interferometric spectral discriminator creates an interferogram from which the wavelength spectra for each pixel of the array can be calculated, typically using Fourier transform analysis.

In one aspect of the invention, the chromatic accuracy of the system is calibrated using a "calibration slit" placed at, and to one side of the input aperture of the input relay lens, the input relay lens collimating the light entering the interferometric spectral discriminator. The image of the slit passes through the discriminator and is imaged next to the image of the sample on the detector array. The calibration slit is illuminated using any of a variety of sources of known wavelength. The output of the spectral discriminator is calibrated for a range of wavelengths by determining the fringe count and processing the CCD output for the Fast Fourier Transform (FFT) channel versus the wavelength of the input light associated with the slit for incident light of two or more wavelengths.

In another aspect of the invention, a transparent optic is included in the interferometric spectral discriminator that can be inserted into the beam path whenever a monochrome image of the sample is required. The optic is inserted in front of one of the turning mirrors within the interferometric spectral discriminator thereby producing a large offset between the legs of the interferometer. This offset results in the fringe density becoming too large to be resolved by the individual pixels of the detector array. Thus a single frame exposure provides a monochrome image of the sample.

In another aspect of the invention, the interferometric spectral discriminator includes a polarizing beam splitter. The polarizing beam splitter preferentially reflects one polarization while preferentially transmitting a second polarization. Thus one polarization follows one beam path while a second polarization follows a second beam path. The two polarizations are combined at the focus of the output relay lens. The polarizing beam splitter thereby provides enhanced efficiency while decreasing ghosting within the sample image.

In another aspect of the invention, a metaphase finder is used to locate areas of interest, thus avoiding wasting analysis time on areas containing only undesirable materials such as cell debris. The metaphase finder utilizes Rayleigh scattering to locate metaphase spreads. The sample plate (e.g., microscope slide) containing the material of interest is illuminated with light of a wavelength determined to preferentially scatter from objects with dimensions of the size of the objects contained within the metaphase spreads (e.g., chromosomes). The intensity of the scattered light versus the location on the sample plate is monitored. This information is used to determine areas of increased scatter, and thus the areas of interest. In order to achieve better discrimination between the metaphase spreads and other matter contained on the sample plate, the plate may be illuminated with light of a second wavelength and the scattered light versus location monitored. The second wavelength is selected such that it does not exhibit increased scattering for the objects of interest and therefore represents background scatter. By subtracting the background scatter from the initial scatter measurements, improved signal to noise is achieved.

A further understanding of the nature and advantages of the present invention may be realized by reference to the remaining portions of the specification and the drawings.

DETAILED DESCRIPTION OF THE INVENTION

Fluorescence in situ hybridization (FISH) has become an important technique for visualizing DNA sequences in metaphase chromosomes and interphase nuclei. The method is now in routine use in research laboratories for gene localization studies. For example, FISH is used to map genes to specific chromosome regions or to order clones along chromosomes to create or validate clone contigs. More recently, FISH has been applied in clinical situations to detect a variety of chromosome abnormalities.

Recent efforts in FISH have focused on the development of probe technology. At present, probes are available to a variety of chromosome regions, such as telomeres, or large single-copy genes. These probes have great utility in molecular cytogenetics, with one example being the use of centromere specific probes, derived from repetitive DNA at the centromere of chromosomes, in chromosome enumeration studies. Often these repeat sequences are unique to a specific chromosome and therefore may be used to determine the number of copies of a given chromosome contained in a cell. In addition, a class of probes termed chromosome paints have recently become available. This type of probe is very useful for determining chromosome structure, as they more or less uniformly hybridize to the entire length of a given chromosome. Paints are used to determine chromosome complements of a cell, structural abnormalities such as translocations, and to identify the origin of marker chromosomes.

Numerous methods are available to label DNA probes for use in FISH, including indirect methods whereby a hapten such as biotin or digoxigenin is incorporated into DNA using enzymatic reactions. Following hybridization to a metaphase chromosome spread or interphase nuclei, a fluorescent label is attached to the hybrid through the use of immunological methods. More recently, fluorescent dyes have been directly incorporated into probes and detected without the use of an intermediate step. Standard FISH dyes include fluorescein, rhodamine, Texas Red and Cy dyes. Multiprobe FISH analysis can be accomplished by labeling different probes with different haptens or fluorescent dyes.

The number of useful dyes for FISH is relatively limited. In order to increase the number of probes that may be imaged in a given experiment, combinatorial fluorescence approaches have been developed. In a combinatorial approach fluorescent reporter groups are used either singularly or in combination. The table below illustrates how three fluorescent reporters, A, B, and C can be used for up to seven probes. The number of detectable probes can be increased to fifteen with four fluorophores, twenty six with five dyes, and $2^n-1$ combinations where n is equal to the number of dyes.

| Probe Number | Reporter Combination |
| --- | --- |
| 1 | A |
| 2 | B |
| 3 | C |
| 4 | A + B |
| 5 | B + C |
| 6 | A + C |
| 7 | A + B + C |

Figure 1:
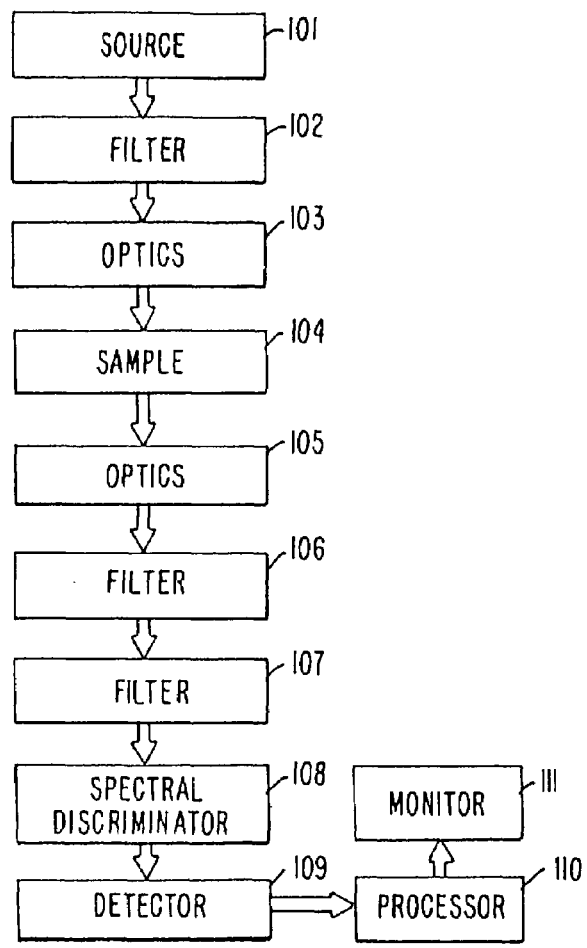
FIG. 1 is a functional block diagram of a fluorescence imaging apparatus.

FIG. 1 is a functional block diagram of a fluorescence imaging apparatus. Light from a light source 101 passes through a filter assembly 102. Filter assembly 102 removes undesired wavelengths from the emission band of the light source, primarily passing the wavelengths necessary to excite the selected fluorochromes and eliminating the emission bands of the excited fluorochromes. The selected radiation then passes through condensing optics 103 prior to irradiating sample 104. The light that leaves sample 104, both emitted fluorescence as well as incident light scattered by sample 104, passes through optics 105 and a filter assembly 106. Filter assembly 106 removes a large percentage of the scattered light, passing selected bands of the emitted fluorescence. In some embodiments of the invention further filtering may be required. In these instances the light exiting filter 106 is passed through a second filter assembly 107. The filtered fluorescence spectra then passes through a spectral discriminator 108 prior to being imaged using a megapixel charge coupled device (CCD) array 109. Signals from the CCD array are sent to a processor 110 that is used to construct images of sample 105. The images are presented on a CRT or other monitor 111.

A number of techniques can be utilized in designing spectral discriminator 108, thus enabling the apparatus to spectrally discriminate the emitted fluorescence spectra and distinguish between the various probes. These techniques fall into two basic categories: dispersive elements and filters. These techniques are discussed in detail in co-pending U.S. patent application Ser. No. 08/585,303, incorporated herein in its entirety.

Figure 2:
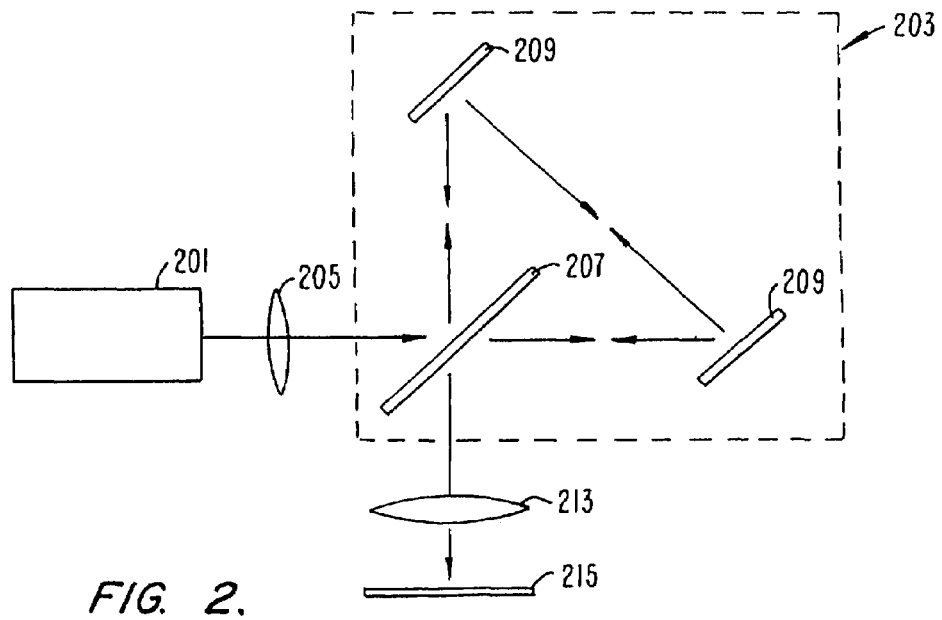
FIG. 2 illustrates an embodiment of a spectral imaging system.

FIG. 2 illustrates one embodiment of a spectral imaging system that can be used to identify and classify chromosomes. Although there are a number of techniques that can be used to extract the color information from the sample image, the illustrated system utilizes an interferometric process. This approach typically offers the best combination of resolution, cost, space and weight requirements, and processing time. Preferably a Sagnac interferometer is used due to its improved stability.

In the illustrated system, an epifluorescence/phase microscope 201 creates an image of a sample (not shown) which is then relayed to a Sagnac interferometer 203 using relay optics 205. Preferably optics 205 form a collimated beam containing the sample image. Sagnac interferometer 203 is comprised of a beam splitter 207 and turning mirrors 209. A second set of relay optics 213 pass the sample image to a detector 215. In the preferred embodiment, detector 215 is a CCD array.

As illustrated in FIG. 2, beam splitter 207 divides the incoming light into two separate beams. These beams are recombined and form an interference pattern at detector array 215 that is due to the phase shift between the two legs of the interferometer. Thus the fringes of the interferogram are superimposed on the image being analyzed. Utilizing detector array 215, a series of images of the sample are taken as the phase of the fringes is changed. For example, using Sagriac interferometer 203, the phase change is accomplished by rotating the interferometer about an axis through beam splitter 207. A Fourier transform is calculated for each CCD pixel using processor 110.

Figure 3:
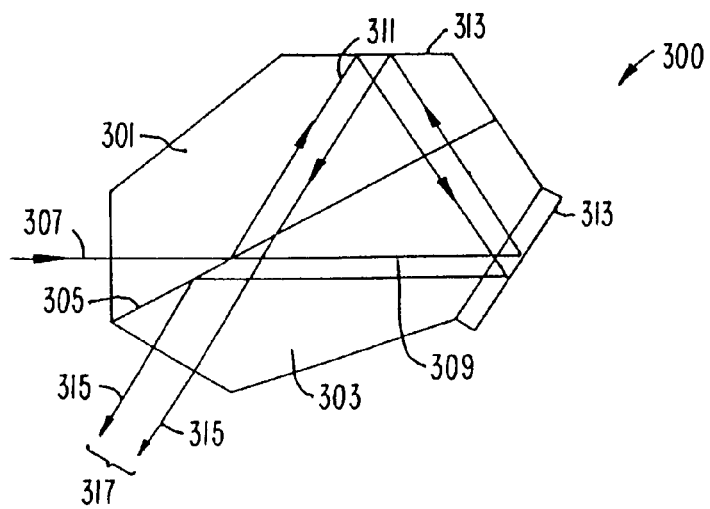
FIG. 3 illustrates a monolithic form of a Sagnac interferometer.

FIG. 3 illustrates a monolithic form of interferometer 300 that can also be used with the present invention. The monolithic interferometer is more immune to vibration, misalignment, and thermal effects than other forms of interferometers. The monolithic interferometer also has a very large acceptance angle.

Interferometer 300 is comprised of a first piece of glass 301 bonded to a second piece of glass 303 along the plane of a beam splitter coating 305. Light is incident on the interferometer along path 307. When this light ray hits beam splitter coating 305, the ray is split into two rays, one ray following path 309 and the other ray following path 311. After being reflected by interferometer mirrors 313, the rays exit the optic along paths 315 separated by a distance 317.

Once the spectral data for each pixel of array 215 has been determined, processor 110 can be used to generate a variety of useful images on screen 111. The identified probes can be viewed either individually or in a variety of combinations, including showing all identified probes simultaneously. Thus, if at least five different dyes are used, it is possible to create a FISH karyotype with each chromosome individually identified. Since many of the probes will contain multiple dyes (i.e., combinations of dyes in a single probe), pseudo-coloring can be used to simplify the presented image. In this scheme each probe is assigned an easily distinguishable color. For example, if three dyes were used to form seven probes, four of the probes would be formed by some combination of dyes. By assigning each probe, including those with multiple dyes, an individual color, the image presented to the user is quite simple and straightforward. The computer can also be used to enhance the image as well as provide intensity profiles (e.g., different colors assigned to different measured intensities).

Alignment Procedure

Figure 4:
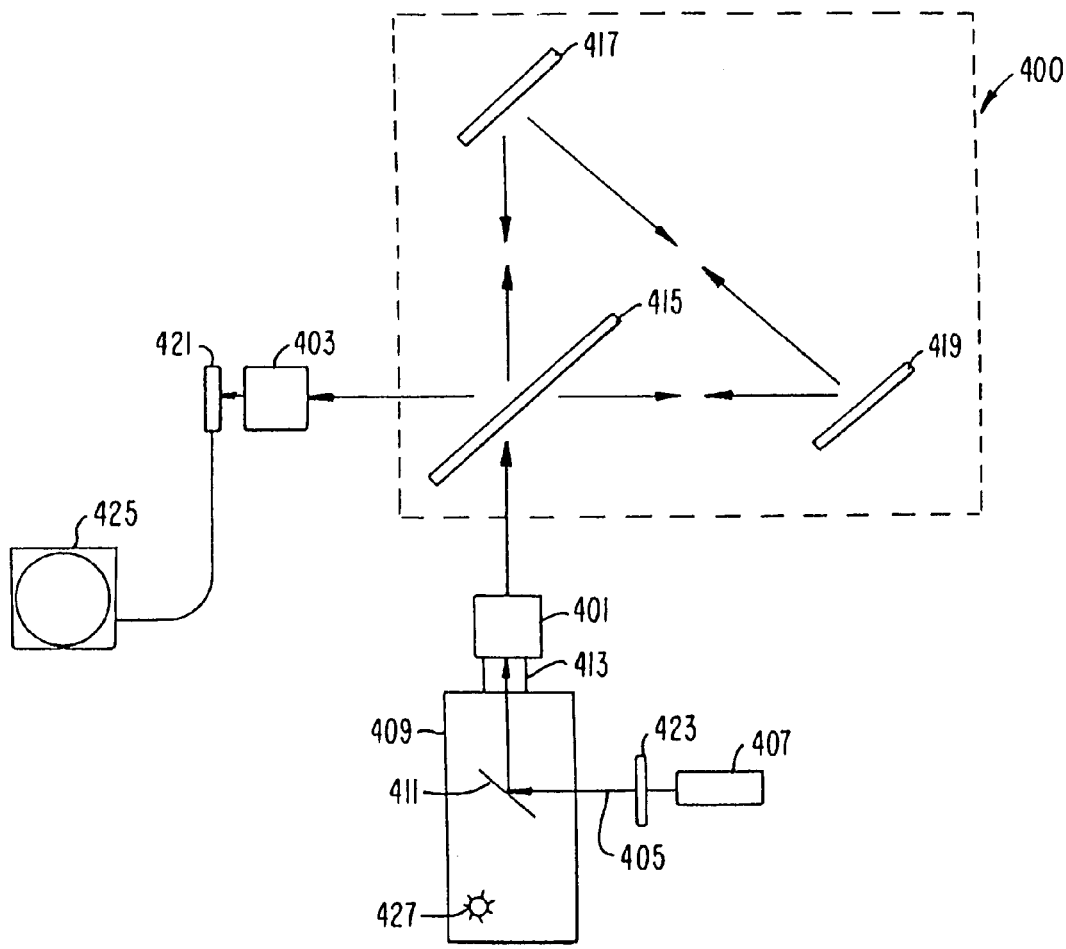
FIG. 4 illustrates an alignment procedure according to the present invention.

In order to achieve the proper results, the interferometer of the spectral discriminator must be properly aligned. Although a variety of alignment procedures may be used, the following procedure has been determined to be both rapid and accurate. Referring to FIG. 4, the alignment procedure assumes the use of a Sagnac interferometer 400 and collimating input and output relay lens 401 and 403, respectively.

Initially, a laser beam 405 from a laser 407 is injected into microscope 409 using a mirror 411. Mirror 411 is placed between the field aperture and the condenser of the microscope. Although a variety of lasers may be used, a HeNe laser of approximately 0.5 milliwatts output is used in the preferred embodiment. Using a 10× objective, the microscope is focussed. Then the beams projected from the eyepieces of the microscope are focussed onto a wall or surface placed a convenient distance away from the microscope, typically 2 to 3 meters away. Focussing is accomplished by adjusting the condenser lens. To complete the laser alignment procedure, an eyepiece is removed and the focussed spot is maneuvered into the proper position relative to the unfocussed spot, the proper position being defined by the spacing and orientation of the two focussed spots prior to removing the eyepiece. Spot movement is accomplished by rotating mirror 411 and adjusting the condenser lens. At the conclusion of this step and after the eyepiece has been replaced, the distance between the two focussed spots should be the same as the distance between the two eyepieces of the microscope.

Next, beam 405 is switched from passing through the eyepieces to passing through a C-mount 413, thus causing the beam to pass through interferometer 400. At this point beam splitter 415 should be removed from interferometer 400. After locating the focussed beam onto the center of turning mirror 417 by rotating the optical table of the system, mirror 417 is adjusted to align the beam onto the center of turning mirror 419. Mirror 419 is then adjusted to locate the beam onto the center of output relay lens 403. Before aligning the laser beam onto a detector array 421, a neutral density filter should be inserted into the laser beam, for example at a location 423. For a 0.5 milliwatt HeNe laser, a ND 7.0 filter is typically sufficient to prevent detector array 421 from being damaged. After the neutral density filter has been inserted into the beam path and power has been applied to detector 421, a spot will appear on monitor 425 corresponding to the pixel of array 421 being illuminated by the laser beam. Mirror 419 may then be adjusted to align the beam with the center of detector array 421.

In order to complete the alignment of interferometer 400, detector array 421 must first be turned off, neutral density filter 423 removed, and beam splitter 415 re-inserted into the interferometer. Beam splitter 415 is adjusted until only a single beam enters output relay lens 403. The 10× objective is then removed and minor adjustments are made to mirrors 417 and 419 as well as the condenser lens in order to cause the two beams to be concentric at the entrance of output relay lens 403 and coaxial with the optical axis of the system. At this point fringes should be visible at relay lens 403, although it may be necessary to insert a white card in front of lens 403 in order to see the fringes. Alternatively, the laser can be removed, the 10× objective replaced, and the fringes due to source 427 of microscope 409 incident on array 421 may be observed via monitor 425.

Next, laser 407 and mirror 411 are removed, the 10× objective is re-inserted into the system, and darkfield light source 427 and detector array 421 are turned on. The output of microscope 409 in conjunction with interferometer 400 is then centered onto array 421 by adjusting mirrors 417 and 419. Tilting mirrors 417 and 419 accomplish two things. If the two mirrors are tilted in the same direction relative to the beam path, the fringes will be changed. If the two mirrors are tilted in opposite directions relative to the beam path, the image will be shifted. This is true along both the x- and y-axes of the image.

The fringes produced by interferometer 400 are then focussed by adjusting output relay lens 403. This adjustment causes the overall image on the CCD camera to darken while increasing the fringe modulation. A test pattern reticle is then placed on the stage of microscope 409 and input relay lens 401 is adjusted to achieve optimum image focus. Lastly, a 520 nanometer band pass filter is placed in the beam path and the distance between beam splitter 415 and mirror 419 is adjusted in order to achieve a fringe count of approximately 50 fringes over the 512 pixels of array 421.

Slit Calibration

As described above, when the spectral discriminator is an interferometer and the interferometer is used to form an interferogram of the sample, one method of translating the interferogram into chromatic space is through the use of a Fourier transform. It is then necessary to use some means of calibration to translate the Fourier transform channel number into a wavelength. One method of calibration is through the use of a slit as illustrated in FIG. 5.

Figure 5:
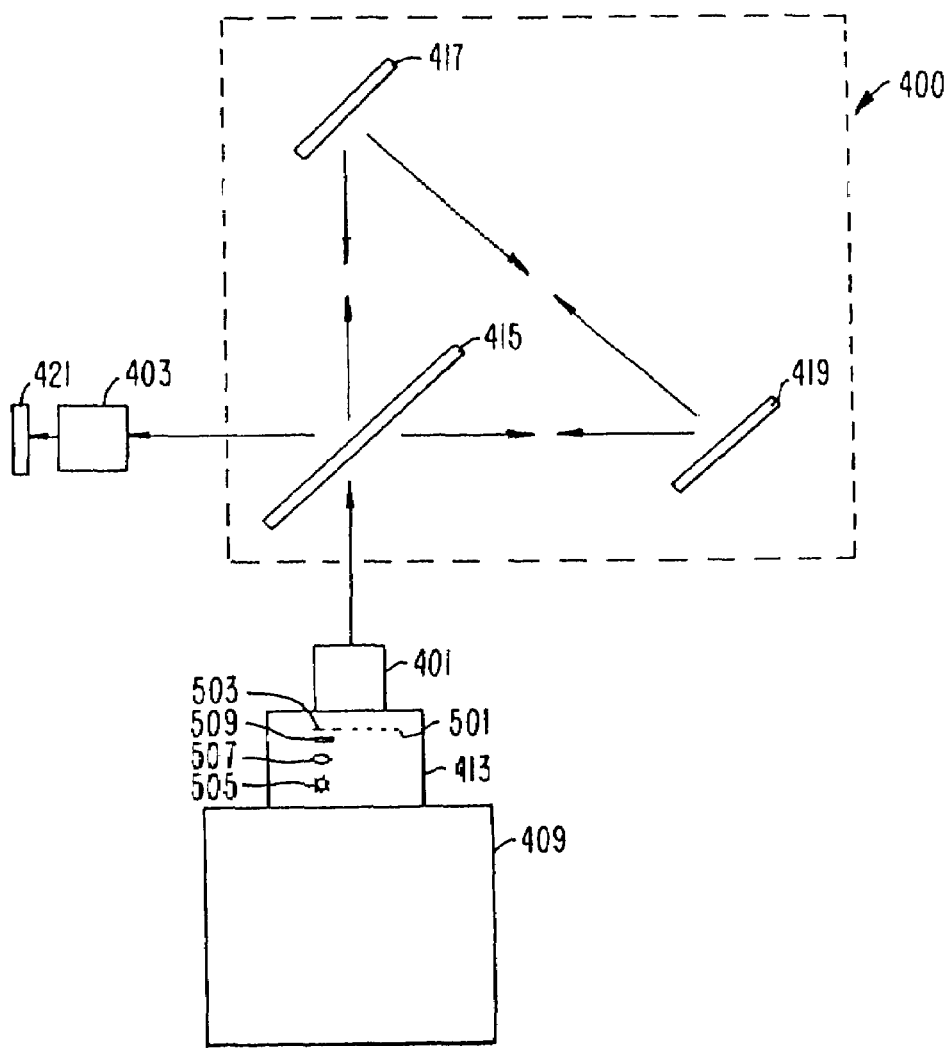
FIG. 5 illustrates a calibration system utilizing a back-lit slit.

Microscope 409 of FIG. 5 includes a C-mount 413. An image of the sample is imaged by microscope 409 at an image plane 501 above C-mount 413. It is the image contained at the image plane 501 that is collected by relay lens 401 and passed through spectral discriminator 400, in this instance a Sagnac interferometer. In this embodiment of the invention, a calibration slit 503 is placed within image plane 501.

Calibration slit 503 is illuminated by a light source 505. Typically the light from source 505 is focussed onto slit 503 with one or more focussing optics 507. The image of slit 503 is collected by optics 401, passed through the spectral discriminator 400, and imaged onto detector 421 by output relay optics 403. By utilizing a detector array 421 that is larger than the sample image, the image of slit 503 can be recorded in an adjacent, unused portion of array 421.

Figure 6:
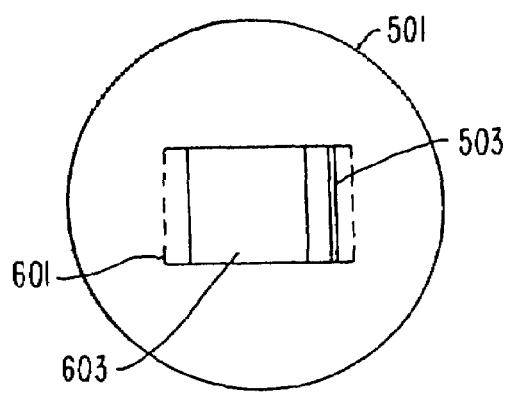
FIG. 6 illustrates the image plane of the calibration system shown in FIG. 5.

FIG. 6 provides a top view of image plane 501. Portion 601 of image plane 501 is a projection of the CCD detector array onto image plane 501. Within area 601 is an image aperture 603. Image aperture 603 passes the image of the sample from microscope 409 through discriminator 400 to be imaged onto detector 421. Outside of image aperture 603 but within the projection of CCD array 601 is slit 503. Therefore even though slit 503 is imaged onto the detector array, its image is not coincident with the sample image.

Source 505 is preferably a laser, for example a laser diode. The light illuminating slit 503 must be of a known wavelength, thus allowing the system to be calibrated. In order to allow the sample image to be calibrated across the desired wavelength spectra, at least two, and preferably three, wavelengths must be used during the system calibration. This allows a range of wavelengths to be interpolated from the two or more known wavelengths. In one embodiment multiple laser diodes 505 are utilized, each operating at a different, known wavelength. In another embodiment, source 505 emits multiple wavelengths and one or more bandpass filters 509 are used to select the desired wavelength.

One benefit of the invention is that it provides calibration data for each sample image. Therefore if the system is unstable from image to image, the instabilities may be calibrated out of the final data. Additionally, the present invention may be fully automated. In this embodiment the output of array 421 is coupled to processor 110. Processor 110 may use the image of slit 503 as well as the knowledge of the illumination wavelength to calibrate the sample image. If desired, filter 509 may be automated and placed under the control of processor 110.

Fringe Free Sample Images

During the use of a spectral imaging system, it is often desirable to observe a simple monochrome image of a sample. For example, the user may wish to simply identify a location of interest. After the location of interest has been identified, a full color analysis of that portion of the sample can be performed. In order to make such an option viable, it must be possible to obtain the monochrome image at a relatively rapid rate in comparison to the full color image. Therefore obtaining a complete interferogram first, and then generating the monochrome image by deriving a gray scale or by computationally removing the fringe bars is not a practical solution.

Figure 7:
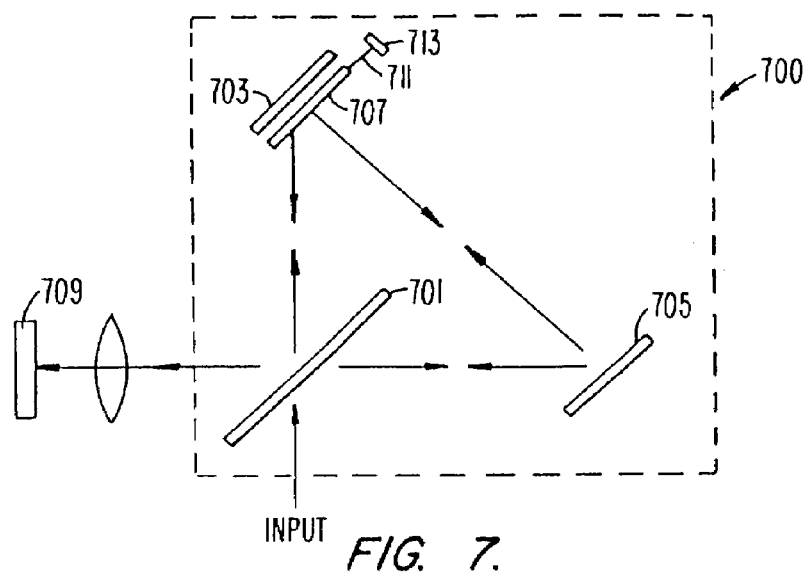
FIG. 7 illustrates one aspect of the invention that can be used to quickly obtain a fringe free image of the sample.

FIG. 7 illustrates one aspect of the invention that can be used to quickly obtain a fringe free image of a sample. The spectral discriminator 700 of FIG. 7 is suitable for inclusion within a spectral imaging system such as that illustrated in FIGS. 2, 4, and 5. As described above, spectral discriminator 700 includes a beam splitter 701, a first turning mirror 703, and a second turning mirror 705. In addition, this system includes an optic 707 that can be inserted in front of one of the mirrors, in this case mirror 703, without altering the position of either turning mirror. The insertion of optic 707 produces an extremely large offset between the legs of the interferometer, thus causing the fringe density to become too large to resolve by the individual pixels of detector array 709. Therefore it is not necessary to computationally remove the fringe bars and a monochrome image of the sample is obtained with a single frame exposure.

In the preferred embodiment, optic 707 is a window 8 millimeters thick formed of BK-7 with less than 3 arc minutes of wedge. Preferably optic 707 is coated with an anti-reflection coating. Although optic 707 may be manually inserted into the beam path, in the preferred embodiment optic 707 is attached to a translation stage 711 that is coupled to a motor 713. Stage 711 and motor 713 allow the user to easily insert optic 707 whenever a fringe free, monochrome image of the sample is desired.

Polarized Beam Splitter

Figure 8:
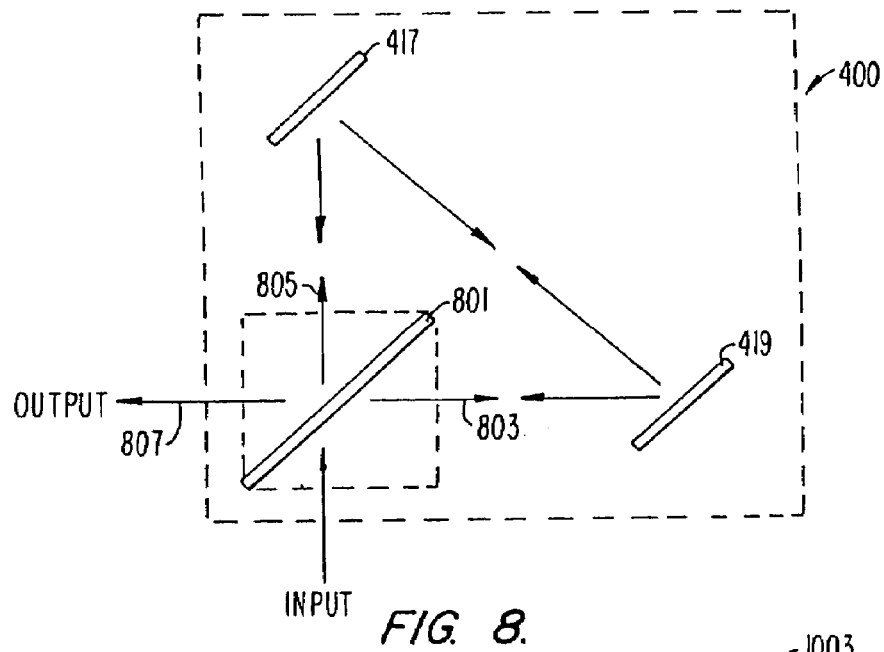
FIG. 8 illustrates the polarizing beam splitter used in a specific embodiment of the invention.

The beam splitter in the Sagnac interferometer shown in the earlier figures (i.e., beam splitter 207 in FIG. 2, beam splitter 415 in FIGS. 4 and 5, and beam splitter 701 in FIG. 7) may be replaced by a polarizing beam splitter 801 as illustrated in FIG. 8. Polarizing beam splitter 801 offers several benefits including increased efficiency and decreased ghosting. In this embodiment beam splitter 801, for example a polarizing beam splitter cube, preferentially reflects one polarization (e.g., s-polarization) while preferentially transmitting a second polarization (e.g., p-polarization). Thus preferentially one polarization follows interferometer beam path 803 while the second polarization preferentially follows second interferometer beam path 805. The two polarizations are then combined in interferometer output beam path 807. The dielectric coatings on turning mirrors 417 and 419 are designed to minimize their effects on the polarization of the incident beams.

Metaphase Finder

When using the spectral imaging system of the present invention, it is often desirable to be able to locate a specific area of interest. For example, in systems designed to study and identify chromosomes, the ability to locate metaphase spreads is desirable. If such an area can be quickly and efficiently located, the user can avoid the time consuming task of processing the entire sample in detail. Rapid location techniques are especially important in conjunction with the present invention due to the time required to process an interferogram.

Figure 9:
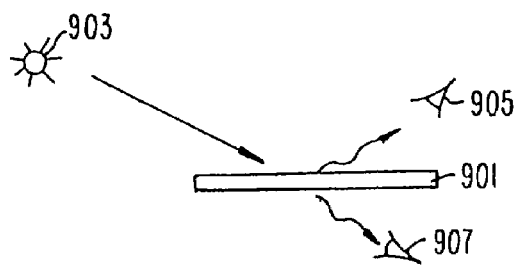
FIG. 9 illustrates a metaphase finder according to the present invention.

The present invention takes advantage of the phenomena commonly known as Rayleigh scattering, referring to the scattering of light by objects that are small in comparison to the wavelength of the incident light. FIG. 9 illustrates the basic concept of the invention. One or more metaphase spreads are contained on a microscope slide 901 along with various other cell matter and debris. Light of a first wavelength from a source 903 irradiates slide 901 and a detector 905 monitors the intensity of scattered light versus location. The wavelength of source 903 is selected to achieve maximum scattering given the dimensions of the metaphase spreads (or other objects) in question. Preferably in order to achieve better discrimination, slide 901 is also irradiated by light of a second wavelength, either by altering the wavelength of source 903 or simply substituting a different source. The second wavelength is selected such that it does not exhibit increased scattering for the objects in question. By subtracting the background, i.e., the scattered light at the second wavelength, from the initial scattered light, the locations of the metaphase spreads (or other objects) may be identified. Once an area of interest has been identified, other techniques such as spectral imaging may be used to study these areas in greater detail.

Many variations of the metaphase finder may be used, primarily depending upon the constraints of the system in which the invention is to be utilized. For example, the detector may also be located at a location 907, thus monitoring the scattered light that passes through slide 901. In this embodiment slide 901 should be designed to exhibit high transmission in the scattered wavelengths, possibly utilizing optical coatings to minimize reflection losses. Although the scattered light which passes through slide 901 may be used alone, it may also be used in conjunction with reflected scattered light to achieve a better signal to noise ratio. This configuration requires at least two detectors, one to monitor the reflected scattered light and one to monitor the transmitted scattered light.

Figure 10:
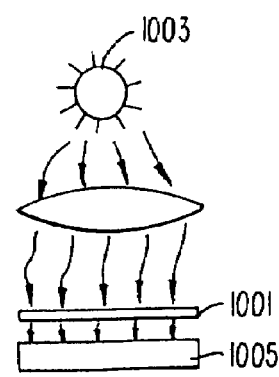
FIG. 10 illustrates a specific embodiment of the metaphase finder according to the present invention.

The location data associated with the objects of interest (e.g., metaphase spreads) may be obtained in a variety of ways. For example, a laser may be used as the light source and the relative positions of the laser and the detector may remain constant. By raster scanning the sample using a x-y translation stage (e.g., numerically controlled stage) under the beam of the laser(s), the scattering from the entire sample may be mapped. Alternatively, the beam from the laser(s) may be raster scanned across the sample. However, this approach requires accurate knowledge of the beam location on the sample in order to be able to later return to the locations containing the objects of interest (e.g., metaphase spreads). Alternatively, the light scattered from the sample may be imaged onto a detector array, thus offering a one-to-one correspondence between locations on the sample and the detector array. In this configuration the sample may either be raster scanned using a laser source, or the entire sample may be illuminated by a large area source in the wavelength or wavelengths of interest. For example as illustrated in FIG. 10, an entire sample 1001 may be illuminated by a single source 1003. A detector array 1005 monitors the scattered radiation passing through sample 1001, thus providing both the intensity of the scattered radiation as well as the locations of maximum scatter.

As will be understood by those familiar with the art, the present invention may be embodied in other specific forms without departing from the spirit or essential characteristics thereof. Accordingly, disclosure of the preferred embodiment of the invention is intended to be illustrative, but not limiting, of the scope of the invention as set forth in the following claims.

What is claimed is:

1. An apparatus for obtaining a monochrome sample image in a spectral imaging system that includes an interferometer, comprising:

a sample;

a source for illuminating said sample with radiation within a first band of wavelengths, wherein said first band of wavelengths excites regions within said sample causing said regions to emit radiation within a second band of wavelengths;

an interferometer for spectrally resolving said wavelengths within said second band of wavelengths, wherein said interferometer creates an interferogram of said sample that is superimposed on an image of said sample transmitted by said interferometer, wherein said interferometer is comprised of at least a pair of turning mirrors and a beam splitter forming a pair of legs for said interferometer;

a detector array, wherein said sample and said interferogram of said sample are imaged on said detector, wherein said detector array outputs a plurality of signals corresponding to an intensity at each pixel of said array;

an optic with a first position and a second position, wherein said optic in said first position is adjacent to one of said pair of turning mirrors and intercepts light beams within said interferometer passing to and from said one of said pair of turning mirrors thereby producing a large offset in said pair of legs of said interferometer, wherein said optic in said second position does not intercept light beams within said interferometer, wherein said large offset causes a density of fringes created within said interferogram to become larger than the resolution limits of said detector array; and a processor coupled to said detector array, wherein said processor generates said monochrome image of said sample from said output signals of said detector array when said optic is in said first position.

2. The apparatus of claim 1, wherein said optic is formed of BK-7 and is at least 5 millimeters thick.

3. The apparatus of claim 1, wherein said optic is coupled to a translation mechanism, said translation mechanism moving said optic from said first position to said second position.

4. The apparatus of claim 3, wherein said translation mechanism is controlled by said processor.

5. A method of obtaining a monochrome sample image in a spectral imaging system that includes an interferometer, wherein said interferometer is comprised of at least a pair of turning mirrors and a beam splitter to form a pair of legs, said method comprising the steps of:

inserting an optic adjacent to one of said pair of turning mirrors, wherein said optic intercepts light beams within said interferometer thereby producing a large offset in said pair of legs of said interferometer, said large offset causing a density of fringes within an interferogram created by said interferometer to become larger than the resolution limits of a detector array, said detector array monitoring an output of said interferometer;

generating said monochrome image of said sample with a processor, said processor coupled to said detector array; and displaying said monochrome image on a monitor coupled to said processor.

* * * * *